G. HOTCHKISS.
Ox Yoke.
No. 367. Patented Aug. 31, 1837.
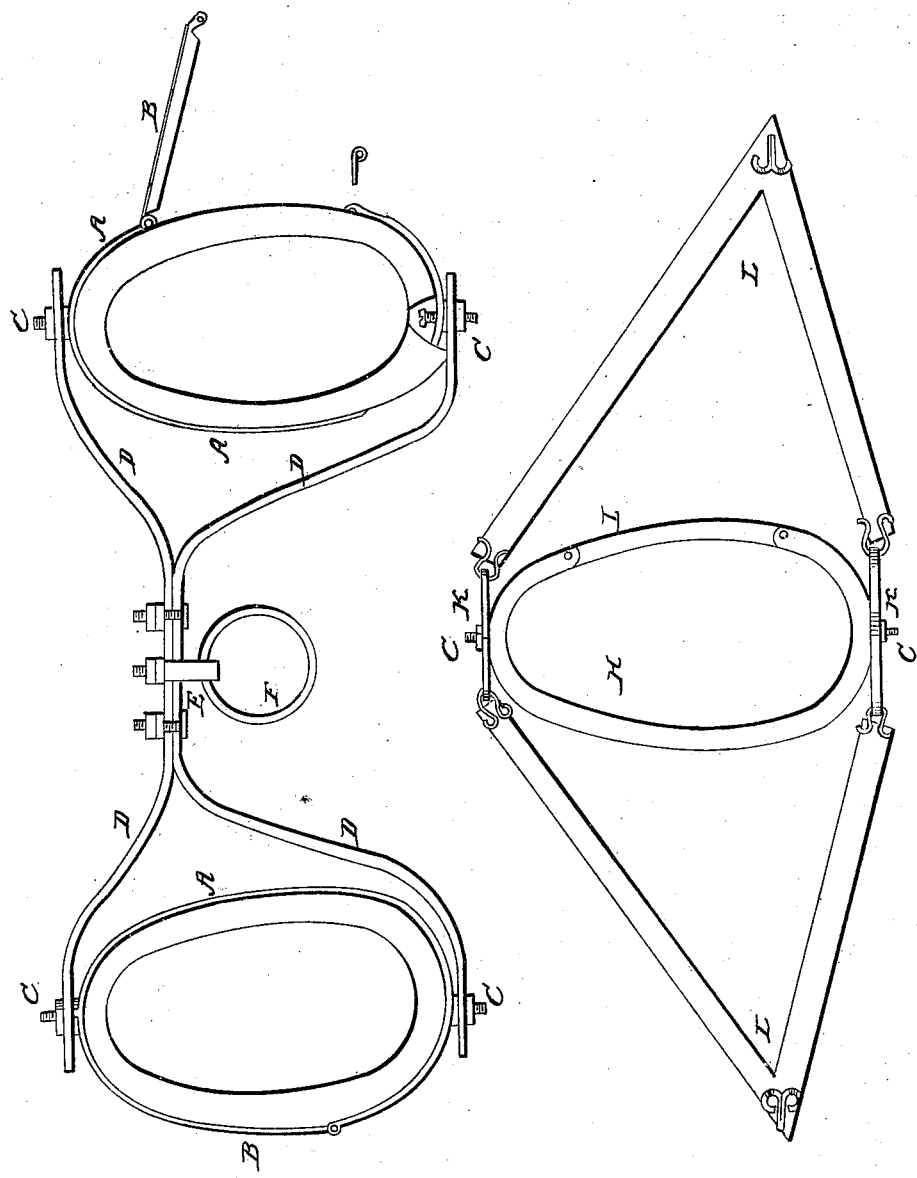

UNITED STATES PATENT OFFICE.

GIDEON HOTCHKISS, OF WINDSOR, NEW YORK.

YOKE FOR HORSES OR OXEN.

Specification of Letters Patent No. 367, dated August 31, 1837.

*To all whom it may concern:*

Be it known that I, GIDEON HOTCHKISS, of the town of Windsor, county of Broome, and State of New York, have invented a new and useful Improvement in the Construction of the Bows or Hames Used to Harness or Gear Cattle, Oxen, or Horses and the manner they are connected with the yoke if used for oxen or the manner they are connected together and the manner the power is conveyed or applied to the load when used by horses.

My improvement consists of two bows of iron or wood or partly of iron and partly of wood of an oblong or oval shape bent around at both ends so as to suit the shape of the bearing part of the animal's neck and breast, with a door or opening on one side of each bow, of such length or dimensions as may be necessary for the ingress and egress of the animal's neck; said door or opening in the bows may be formed by hinges or a lock joint by which it can be opened and closed at pleasure. Said joint or door may be hung at any part of the circumference as shall be most appropriate to yoke and unyoke the animals.

On each end of these bows at the center are pivots or gudgeons projecting up from the top end and down from the bottom end of each bow or collar of sufficient dimensions for the required strength. Said pivots or gudgeons are secured in their hangings by a nut and screw or key holes, through the outer ends of said gudgeons, on which the bows or collars turn so as to bear equally on each shoulder as the animal is moving along and while the yoke or cross bar lays in an angling position caused by the alternate relative position of the animals there is constantly maintained an equilibrium of application to each animal and also each shoulder of the aforesaid animals let their position be as it may.

These bows when used for oxen are connected by a yoke made of iron or partly of iron and partly of wood with branches or crotches at each end extending up and down or directly over and under the animal's neck with pivot or gudgeon holes in their ends corresponding in size with the gudgeons by means of which said bows are hung. The center between the crotches or branches to be so depressed as to bring the center of the draft at such a place as will be the easiest for the animal, with a staple and ring as in other yokes.

Said bows may be connected by two cross bars, either straight or curved to extend over and under the neck with pivot holes as aforesaid for the reception of the gudgeons in the bows. Said holes may be so arranged that the animals may be placed nearer together or further apart as occasion may require to prevent them from crowding or hauling, since extra holes for the contracting or expanding the position of the animals may be used or not whether the gearing apparatus is applied to oxen or horses.

Said yoke or cross bars and bows may be constructed in a cylindrical form of cast or wrought iron made hollow in the requisite shape, or in a semi-cylindrical form, one side a concavity and the other a convexity, thereby obtaining more strength from the same weight of materials than could be in a solid form.

Said branches or cross bars may be made of two pieces of wood in a straight form, one placed over the other at the requisite distance to receive the bows or hames as before described, and at their centers connected by one or two vertical posts from which the draft is applied or may be made of two crooked pieces of wood steamed and bent or otherwise crooked enough to join together in the center and receive the bows and draft as before described or one of the cross pieces may be of wood crooked and the other of cast or wrought iron to form the branches in one or two pieces either over or under to suit convenience or fancy.

The ends of the branches when made of wood, may be plaited or ferruled at the ends forming the required number of pivot holes for the reception of the bows or may be secured as aforesaid with cast or wrought iron sockets to inclose the wood or in the form of a shank in either way to be proportioned as to size and form to attain the greatest strength from the material used and form said pivot holes.

May be made of two crooked pieces joined at the center by bolting or riveting their convexed sides onto a band of cast or wrought iron, being reversed, one up and the other down, said band thus unites the upper and lower branches and makes fastenings for the draft either by a tongue or chain.

When applied to a single horse a cross bar in the form of a swingletree with a pivot hole in the center and hooks or fastenings on each end. Said swingletree is attached to the top and bottom of the bows or hames lying crosswise of the animal's neck and horizontally on the aforesaid gudgeons or pivots. From the ends of said swingletree or cross bar (if not from the gudgeons or pivots) and on each side of the animal is a strap or chain or partly strap and partly chain in the form of the letter V or two sides of a triangle one side of the branches taking hold of the top and the other the bottom balance or swingletree as aforesaid. At the junction of the two branches the draft is secured which permits the hame or collar to vibrate with the motion of the animal's shoulders. Said balance or swingletree may be formed in such a manner as to rock or turn against the fore part of the top and bottom of said hame collars and dispense with the pivots, except what may be necessary to keep the balance central or an extra bow or frame may encircle the aforesaid hame from which the tugs may be attached as in the usual form.

Said gearing apparatus may be so constructed that the animals may move in and out by means of the pivots moving to and fro in separate pieces working in hollow branches and so constructed that each end will work in and out by means of the aforesaid slides with their pivot holes in their extremities, &c., or said cross bars may be hung on straps of leather or iron attached to the top and bottom of the hames or collars by their pivots. Said straps extend back or in the rear of the hames, to which straps or hanging is attached the ends of the cross bars which are so hung that there will be an equilibrium of pressure on each of the animals while they have liberty to move out and in.

What I claim as my invention is—

The manner of combining the part which constitutes the collar, in the above described yokes, with the branched yoke, or with the cross bars, as herein set forth, by means of pivots.

GIDEON HOTCHKISS.

Witnesses:
Wm. P. Elliot,
Hazard Knowles.